United States Patent
Kato et al.

(10) Patent No.: US 10,274,929 B2
(45) Date of Patent: Apr. 30, 2019

(54) SERVO CONTROLLER

(71) Applicant: FUJI CORPORATION, Chiryu (JP)

(72) Inventors: Naohiro Kato, Okazaki (JP);
Michinaga Onishi, Chiryu (JP)

(73) Assignee: FUJI CORPORATION, Chiryu (JP)

( * ) Notice: Subject to any disclaimer, the term of this patent is extended or adjusted under 35 U.S.C. 154(b) by 198 days.

(21) Appl. No.: 15/035,406

(22) PCT Filed: Nov. 14, 2013

(86) PCT No.: PCT/JP2013/080790
§ 371 (c)(1),
(2) Date: May 9, 2016

(87) PCT Pub. No.: WO2015/071991
PCT Pub. Date: May 21, 2015

(65) Prior Publication Data
US 2016/0291572 A1    Oct. 6, 2016

(51) Int. Cl.
*G05B 19/402* (2006.01)
*G05B 19/19* (2006.01)
(Continued)

(52) U.S. Cl.
CPC .......... *G05B 19/402* (2013.01); *G05B 11/01* (2013.01); *G05B 19/05* (2013.01); *G05B 19/18* (2013.01);
(Continued)

(58) Field of Classification Search
CPC ............. G05B 19/402; G05B 11/01; G05B 2219/34013; G05B 2219/41173; G05B 2219/41431; G05B 2219/42019
(Continued)

(56) References Cited

U.S. PATENT DOCUMENTS 4,221,176 A * 9/1980 Besore ............... D05B 21/00
112/102.5
4,719,397 A * 1/1988 Kneifel, II ........... G05B 19/371
318/567
(Continued)

FOREIGN PATENT DOCUMENTS

EP    1 768 248 A1    3/2007
JP    2001-331222 A   11/2001
(Continued)

OTHER PUBLICATIONS

International Search Report dated Dec. 10, 2013 for PCT/JP2013/080790 filed on Nov. 14, 2013.
(Continued)

*Primary Examiner* — Ly D Pham
(74) *Attorney, Agent, or Firm* — Oblon, McClelland, Maier & Neustadt, L.L.P.

(57) ABSTRACT

A controller capable of transmitting and receiving an input signal from a drive circuit corresponding to a moving device, a mounting head, or the like of an electronic component mounting machine or an output signal to the drive circuit for each predetermined period (A/2), in which the controller computes an output signal based on an input signal which is received before the predetermined period, stores the output signal for a time greater than or equal to the predetermined period, and subsequently transmits the output signal to the drive circuit. It becomes possible to set a time (a delay time) from when an input signal is output until an output signal reaches a drive circuit to an arbitrary length by adjusting the storage time.

4 Claims, 7 Drawing Sheets

(51) Int. Cl.
*G05B 19/18* (2006.01)
*G05B 11/01* (2006.01)
*G05B 19/416* (2006.01)
*G05B 19/05* (2006.01)

(52) U.S. Cl.
CPC .... *G05B 19/416* (2013.01); *G05B 2219/2609* (2013.01); *G05B 2219/34013* (2013.01); *G05B 2219/34027* (2013.01); *G05B 2219/41173* (2013.01); *G05B 2219/41431* (2013.01); *G05B 2219/42019* (2013.01)

(58) Field of Classification Search
USPC .................................................. 700/114, 186
See application file for complete search history.

(56) References Cited

U.S. PATENT DOCUMENTS

| | | | | |
|---|---|---|---|---|
| 5,637,973 | A * | 6/1997 | Hirai | B23Q 1/00 318/16 |
| 5,838,512 | A * | 11/1998 | Okazaki | G11B 5/012 360/51 |
| 6,073,053 | A | 6/2000 | Dummermuth | |
| 6,137,753 | A * | 10/2000 | Grimsley | G11B 5/59627 360/75 |
| 6,519,109 | B1 * | 2/2003 | Price | G11B 5/5526 360/78.09 |
| 6,708,385 | B1 * | 3/2004 | Lemelson | B23Q 7/03 29/563 |
| 7,148,635 | B1 | 12/2006 | Piefer et al. | |
| 7,343,660 | B1 * | 3/2008 | Lemelson | B23Q 41/06 29/563 |
| 2004/0037202 | A1 * | 2/2004 | Brommer | G11B 5/012 369/94 |
| 2005/0055132 | A1 | 3/2005 | Matsumoto et al. | |
| 2005/0094299 | A1 * | 5/2005 | Tokizono | G11B 5/6005 360/31 |
| 2005/0111125 | A1 * | 5/2005 | Chung | G01H 13/00 360/31 |
| 2005/0213238 | A1 * | 9/2005 | Mitchell | G11B 20/10009 360/46 |
| 2007/0175540 | A1 * | 8/2007 | Anderson | B65B 39/004 141/130 |
| 2012/0095599 | A1 | 4/2012 | Pak et al. | |
| 2012/0261049 | A1 * | 10/2012 | Weber | B29C 63/0065 156/64 |
| 2015/0224845 | A1 * | 8/2015 | Anderson | B60G 17/019 701/37 |
| 2015/0343561 | A1 * | 12/2015 | Miller | B23K 26/046 219/121.81 |

FOREIGN PATENT DOCUMENTS

| | | |
|---|---|---|
| JP | 2002-186288 A | 6/2002 |
| JP | 2003-145462 A | 5/2003 |

OTHER PUBLICATIONS

Extended European Search Report dated Sep. 19, 2016 in Patent Application No. 13897675.8.
Office Action dated Dec. 18, 2017 in Japanese Patent Application No. 2015-547333 (with English translation).
Office Action dated Jul. 12, 2018 in corresponding Chinese Application No. 201380080837.5 (English translation only).

* cited by examiner

SERVO CONTROLLER

TECHNICAL FIELD

The present application relates to a servo controller capable of transmitting and receiving an input signal from a drive circuit corresponding to an actuator device of a manufacturing work machine or an output signal to the drive circuit for each predetermined period.

BACKGROUND ART

A servo controller controls the actuation of a servo motor, and a servo motor feeds back a control state such as positional information to the servo controller. The servo controller computes a control value of the servo motor based on the information that is fed back, and the computed control value is transmitted to the drive circuit of the servo motor. The servo controller is capable of transmitting and receiving an input signal from the drive circuit or an output signal to the drive circuit for each predetermined period. Therefore, as described in the following patent literature, the servo controller computes the control value, that is, the output signal based on information relating to the control state of the servo motor which has been acquired immediately before, that is, the input signal which is received within one period. The servo controller transmits the computed control value to the drive circuit after holding the control value for a shorter time than one period or without holding the control value. Accordingly, the servo motor actuates according to the control value.

CITATION LIST

Patent Literature

PTL 1: JP-A-2002-186288

BRIEF SUMMARY

Problem to be Solved

In the servo controller described in the patent literature given above, the output signal is computed based on the input signal which has been acquired immediately before, and the output signal is transmitted to the drive circuit after being held for a shorter time than one period or without being held. Accordingly, a time (hereinafter there are cases in which this will be denoted as the "delay time") from when the positional information or the like is output until a control instruction corresponding to the positional information reaches the drive circuit is shortened, and it becomes possible to responsively actuate the servo motor. However, when controlling the actuation of the servo motor using the above-described method, it is necessary to compute the control value or the like in a short time. Therefore, it is necessary to adopt a servo controller with high computational capabilities, which is disadvantageous cost-wise.

For example, in actuator devices of manufacturing work machines, there are actuator devices capable of being shared between a plurality of manufacturing work machines such as work heads, and in a case in which the control periods of the controllers of the plurality of manufacturing work machines differ, there is a case in which the shared actuator devices operate at an unexpected timing. Specifically, in a case in which a work head can be attached to and detached from each of a first manufacturing work machine which has a servo controller in which the control period is an X period and a second manufacturing work machine which has a servo controller in which the control period is a Y (>X) period, the delay time in the first manufacturing work machine is shorter than the delay time in the second manufacturing work machine. Therefore, the work head which is mounted in the first manufacturing work machine actuates responsively in comparison to a case in which the work head is mounted in the second manufacturing work machine. In other words, the work head which is mounted in the first manufacturing work machine starts to actuate at a fast timing in comparison to a case in which the work head is mounted to the second manufacturing work machine. Accordingly, there is a concern that the work head will, for example, collide, or interfere with other devices or the like, and this is not desirable.

In this manner, sufficient room remains for improvement in a servo controller, and it is considered that the utility of the servo controller will be improved by carrying out various improvements. The application is made in consideration of the issues described above, and aims to provide a servo controller with high utility.

Means for Solving the Problem

In order to solve the problems described above, an aspect of the disclosure of the present application describes a servo controller capable of transmitting and receiving an input signal from a drive circuit corresponding to an actuator device of a manufacturing work machine or an output signal to the drive circuit for each predetermined period, in which the servo controller computes an output signal based on an input signal which is received before the predetermined period, stores the output signal for a time greater than or equal to the predetermined period, and subsequently transmits the output signal to the drive circuit.

An aspect of the disclosure describes the servo controller, in which a second servo controller capable of transmitting and receiving an input signal from the drive circuit or an output signal to the drive circuit for each second period which is longer than the predetermined period computes an output signal based on an input signal which is received within the second period, stores the output signal for a shorter time than the second period or does not store the output signal, and subsequently transmits the output signal to the drive circuit, and in which a time from a timing at which the drive circuit transmits an input signal to the servo controller until a timing at which the drive circuit receives an output signal from the servo controller is the same as a time from a timing at which the drive circuit transmits an input signal to the second servo controller until a timing at which the drive circuit receives an output signal from the second servo controller.

An aspect of the disclosure describes the servo controller, in which the servo controller is capable of transmitting and receiving an input signal from a second drive circuit corresponding to a second actuator device which is different from the actuator device of the manufacturing work machine or an output signal to the second drive circuit for each predetermined period, and the servo controller computes an output signal based on an input signal which is received within the predetermined period, stores the output signal for a shorter time than the predetermined period or does not store the output signal, and subsequently transmits the output signal to the second drive circuit.

An aspect of the disclosure describes the servo controller, in which the actuator device is a work head, and in which the second actuator device is a moving device for moving the work head to an arbitrary position.

Effects

In the servo controller described in an aspect of the disclosure, an output signal is computed based on an input signal which is received before one period instead of an input signal which is received directly before. In the method of the related art, the output signal is transmitted to the drive circuit after being stored for a shorter time than one period or without being stored; however, in the servo controller described in an aspect of the disclosure, the output signal is transmitted to the drive circuit after being stored for a time greater than or equal to one period. Accordingly, it becomes possible to compute a control value using a longer time than in the method of the related art, and it becomes possible to adopt a servo controller with low computational capabilities.

In the servo controller described in another aspect of the disclosure, the delay time in the first manufacturing work machine is the same as the delay time in the second manufacturing work machine. Accordingly, it becomes possible to render the actuation timing of the actuator device which is mounted in the first manufacturing work machine the same as the actuation timing of the actuator device which is mounted in the second manufacturing work machine, and it becomes possible to prevent collision, interference, and the like of the actuator device with another device or the like.

In the servo controller described in another aspect of the disclosure, the second actuator device is controlled according to the method of the related art. Therefore, the servo controller controls the actuator device according to the method of the disclosure and controls the second actuator device according to the method of the related art. Accordingly, for example, it becomes possible to control an actuator device for which there is a concern that collision, interference, or the like with another device will occur due to shortening of the delay time according to the method of the disclosure, and to control an actuator device for which there is no concern that collision, interference, or the like with another device will occur due to shortening of the delay time according to the method of the related art. In other words, it becomes possible to prevent the collision or the like of an actuator device for which there is a concern that collision, interference, or the like with another device will occur, and to responsively actuate an actuator device for which there is no concern that collision, interference, or the like with another device will occur.

In the servo controller described in another aspect of the disclosure, the actuator device is a work head, and the second actuator device is a moving device for moving the work head to an arbitrary position. There is a work head which includes a mechanism that moves a work tool or the like in the up-down direction, and there is a concern that the work tool or the like will, for example, collide, or interfere with another device or the like due to the actuation of the work head. Meanwhile, there is a moving device which moves a work head on the same plane, and in such a moving device, the possibility that collision, interference, or the like will occur is low. Therefore, according to the servo controller described in another aspect of the disclosure, collision, interference, or the like of the work head with another device or the like is prevented, and it becomes possible to responsively actuate the moving device.

DESCRIPTION OF EMBODIMENTS

Hereinafter, detailed description will be given of the example of the disclosure with reference to the drawings.

<Configuration of Electronic Component Mounting Device>

Figure 1:
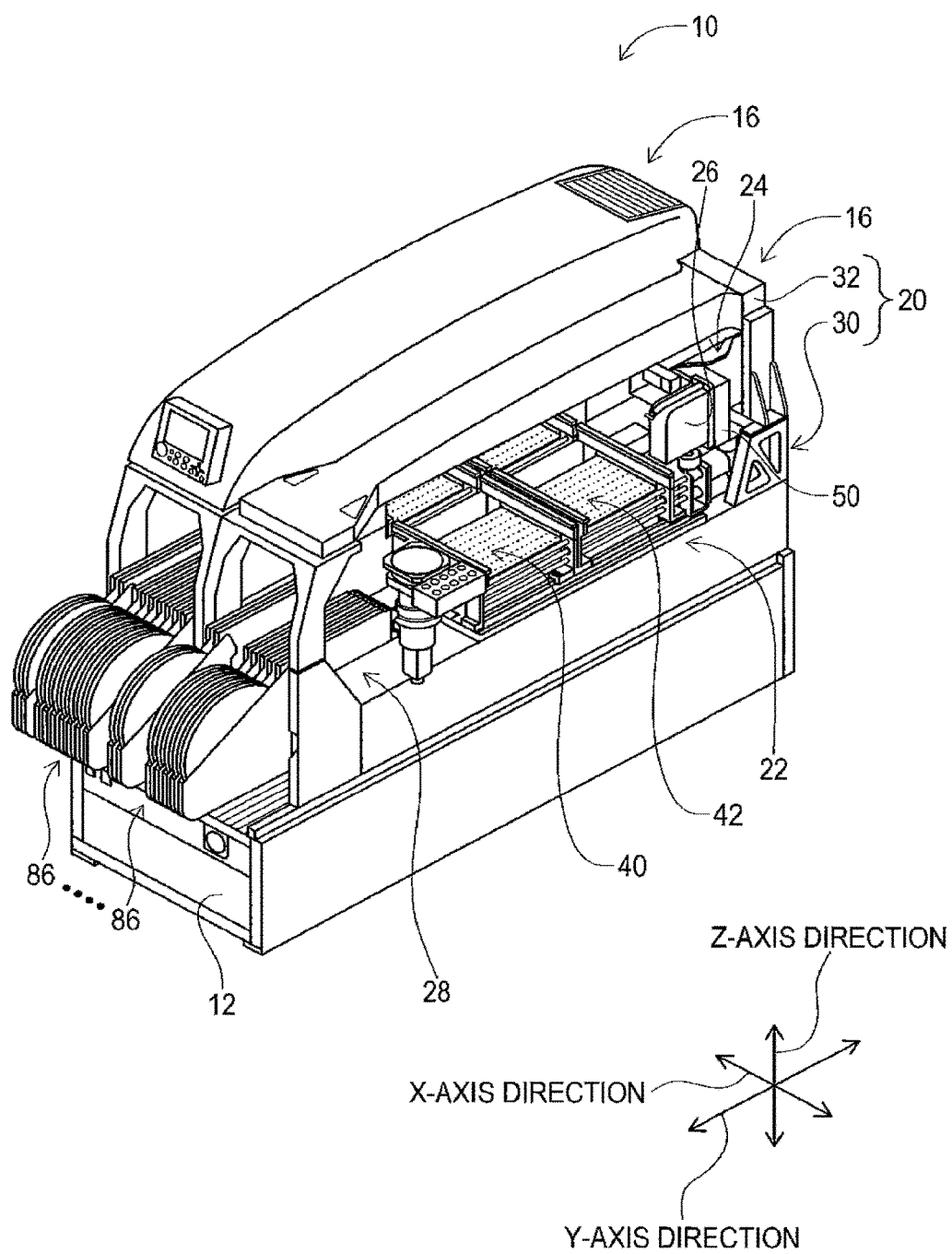
FIG. 1 is a perspective diagram illustrating an electronic component mounting device provided with a controller which is an example of the invention disclosure.

FIG. 1 illustrates an electronic component mounting device 10. The electronic component mounting device 10 includes one system base 12, and two mounting machines 16 which are installed on the system base 12 to line up. Note that, in the following description, a direction in which the mounting machines 16 are lined up will be referred to as an X-axis direction, a horizontal direction at a right angle to the X-axis direction will be referred to as a Y-axis direction, and a vertical direction at a right angle to the Y-axis direction will be referred to as the Z-axis direction.

Each of the mounting machines 16 is provided with a mounting machine main body 20, a conveyance device 22, a mounting head moving device (hereinafter, there are cases in which this is shortened to a "moving device") 24, a mounting head 26, and a supply device 28. The mounting machine main body 20 is formed of a frame section 30, and a beam section 32 which bridges over the frame section 30.

The conveyance device 22 is provided with two conveyance devices 40 and 42. The two conveyance devices 40 and 42 are installed on the frame section 30 to be parallel to each other and to extend in the X-axis direction. The two conveyance devices 40 and 42 convey circuit boards which are supported by the conveyance devices 40 and 42 in the X-axis direction using an electromagnetic motor (refer to FIG. 3) 46. The circuit board is held in a predetermined position in a fixed manner by a board holding device (refer to FIG. 3) 48.

The moving device 24 is an XY robot-type moving device. The moving device 24 is provided with an electromagnetic motor (refer to FIG. 3) 52 which causes a slider 50 to slide in the X-axis direction, and an electromagnetic motor (refer to FIG. 3) 54 which causes the slider 50 to slide in the Y-axis direction. The mounting head 26 is attached to the slider 50, and the mounting head 26 moves to an arbitrary position above the frame section 30 due to the actuation of the two motors 52 and 54.

Figure 2:
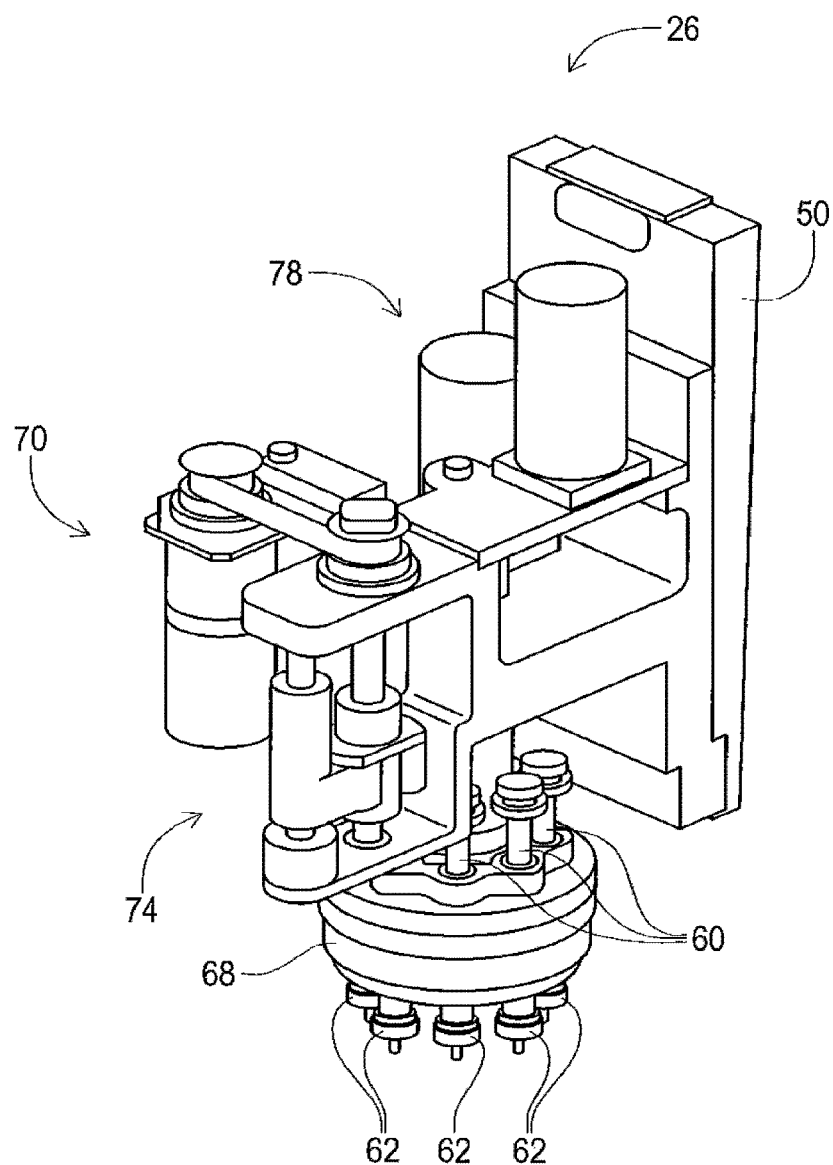
FIG. 2 is a perspective diagram illustrating a mounting head with which the electronic component mounting device of FIG. 1 is provided.

The mounting head 26 mounts the electronic component on the circuit board. As illustrated in FIG. 2, the mounting head 26 is provided with a plurality of rod-shaped mounting units 60, a suction nozzle 62 is mounted to a tip portion of each of the plurality of mounting units 60. The suction nozzle 62 communicates with a positive and negative pressure supply device (refer to FIG. 3) 66 via negative air and positive air paths. The suction nozzle 62 sucks and holds the electronic component using a negative pressure and releases the held electronic component using a positive pressure. The plurality of rod-shaped mounting units 60 are held on an outer circumferential portion of a unit holding body 68 at an equal angle pitch in a state in which the axial direction is vertical, and the suction nozzles 62 extend downward from the bottom surface of the unit holding body 68.

The unit holding body 68 intermittently rotates by the installation angle of the mounting units 60 at a time due to an electromagnetic motor (refer to FIG. 3) 72 of a holding body rotation device 70. Accordingly, the mounting units 60 sequentially stop at a lifting and lowering station (a station in a front most position) which is one stopping position among the stopping positions of the plurality of mounting units 60. The mounting unit 60 which is positioned at the lifting and lowering station is lifted or lowered using an electromagnetic motor (refer to FIG. 3) 76 of a unit lifting and lowering device 74. Accordingly, the position of the electronic component which is sucked and held by the suction nozzle 62 in the up-down direction is changed. A different stopping position from the lifting and lowering station is set as a turning station, and the mounting unit 60 which is positioned at that station is turned by an electromagnetic motor (refer to FIG. 3) 80 of a turning device 78. Accordingly, the holding orientation of the electronic component which is sucked and held by the suction nozzle 62 is changed. Note that, the mounting head 26 can be attached to and detached from the slider 50, and it is possible to mount the mounting head 26 to the slider of a different mounting machine from the mounting machine 16. In other words, the mounting head 26 is capable of being shared between the mounting machine 16 and another mounting machine.

The supply device 28 is a feeder-type supply device and is installed on the end portion of the front side of the frame section 30. The supply device 28 includes a tape feeder 86. The tape feeder 86 contains taped components in a wound state. The taped components are obtained by taping the electronic components. The tape feeder 86 feeds out the taped components using a feed device (refer to FIG. 3) 88. Accordingly, the feeder-type supply device 28 supplies the electronic components to the supply position by feeding out the taped components. Note that, the tape feeder 86 can be attached to and detached from the frame section 30, and may be adapted for the exchanging of the electronic components.

Figure 3:
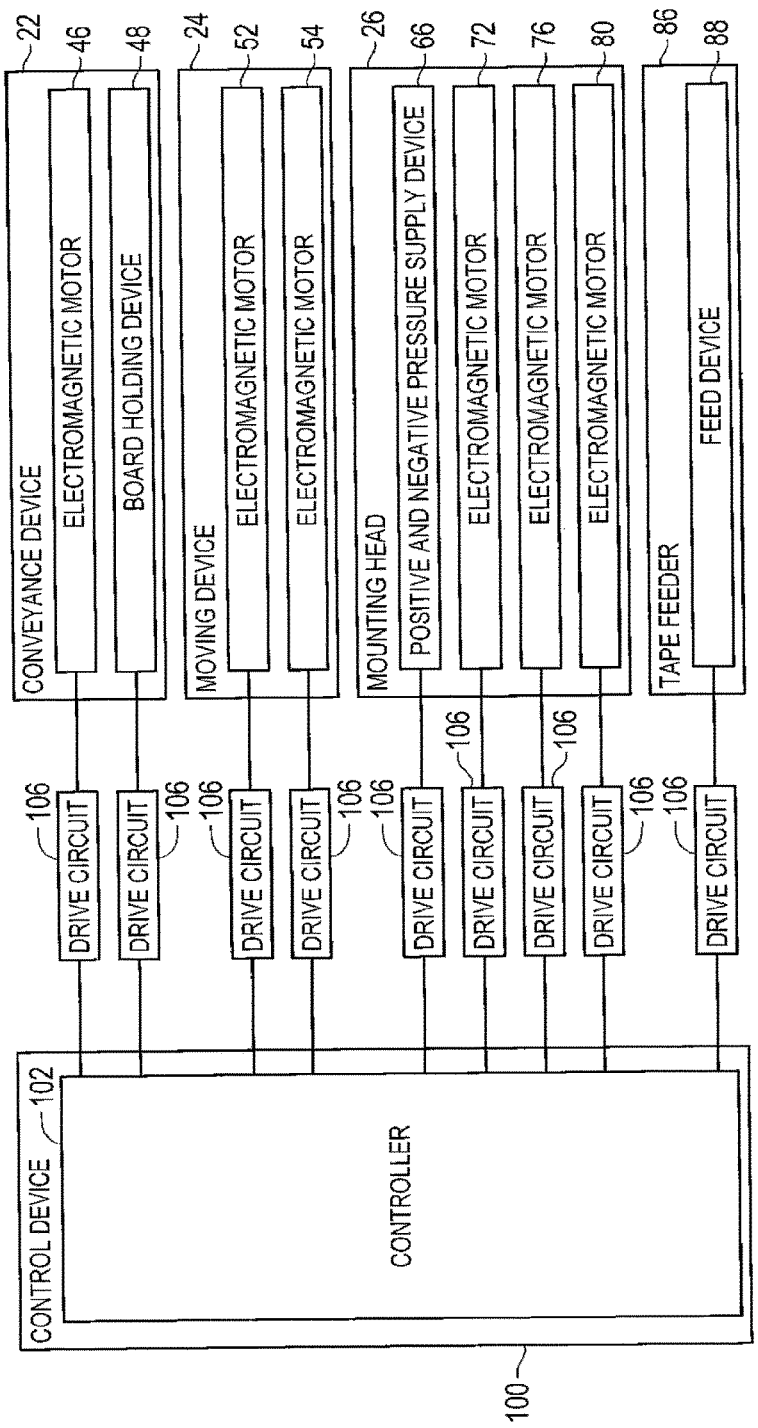
FIG. 3 is a block diagram illustrating a control device with which the electronic component mounting device of FIG. 1 is provided.

As illustrated in FIG. 3, the mounting machine 16 is further provided with a control device 100. The control device 100 includes a controller 102. The controller 102 is provided with a CPU, a ROM, a RAM, and the like and the main component of the controller 102 is a computer. The controller 102 is connected to a plurality of drive circuits 106, and the plurality of drive circuits 106 are connected to the electromagnetic motors 46, 52, 54, 72, 76, and 80, the board holding device 48, the positive and negative pressure supply device 66, and the feed device 88. Accordingly, the operations of the conveyance device 22, the moving device 24, and the like are controlled by the controller 102.

<Mounting Operation by Mounting Machine>

According to the configuration which is described above, in the mounting machine 16, it is possible to perform the mounting operation on the circuit board which is held by the conveyance device 22 using the mounting head 26. Specifically, according to the instructions of the controller 102, the circuit board is conveyed to a working position, and at this position, is held in a fixed manner by the board holding device 48. The tape feeder 86 feeds the taped components and supplies the electronic components to the supply position according to the instructions of the controller 102. The mounting head 26 moves above the supply position of the electronic components and sucks and holds the electronic component using the suction nozzle 62 according to the instructions of the controller 102. Subsequently, the mounting head 26 moves above the circuit board according to the instructions of the controller 102. The mounting head 26 adjusts the position of the held electronic component in the up-down direction, the holding orientation of the electronic component, and the like, and mounts the electronic component at a predetermined position on the circuit board according to the actuation of the unit lifting and lowering device 74, the turning device 78, and the like.

<Improvement of Control Delay>

As illustrated above, in the mounting machine 16, the positional control of the mounting head 26 in the X-axis direction and the Y-axis direction by the moving device 24, and the positional control of the suction nozzle 62 in the Z-axis direction by the mounting head 26 are performed during the mounting operation of the electronic component. In the positional control, feedback control is used, information relating to the position in each axial direction is acquired from an encoder or the like, and the control value of the electromagnetic motor or the like is computed based on the positional information. By a control instruction corresponding to the control value being transmitted to the drive circuit, the target electromagnetic motor actuates and the positional control of the mounting head 26, the suction nozzle 62, and the like is performed.

According to the positional control by the feedback control, it becomes possible to appropriately move the mounting head 26, the suction nozzle 62, and the like to target positions, and it becomes possible to appropriately perform the mounting work. However, in the feedback control, since there is a time (hereinafter there are cases in which this will be denoted as the "delay time") from when the positional information is output from the encoder or the like until a control instruction corresponding to the positional information reaches the drive circuit, there is a concern that a control delay will arise and that the control will become unstable. Therefore, in the mounting machine 16, the controller 102 which has a shorter control period than a controller of the related art is adopted, and improvements in the control delay are obtained.

Figure 4:
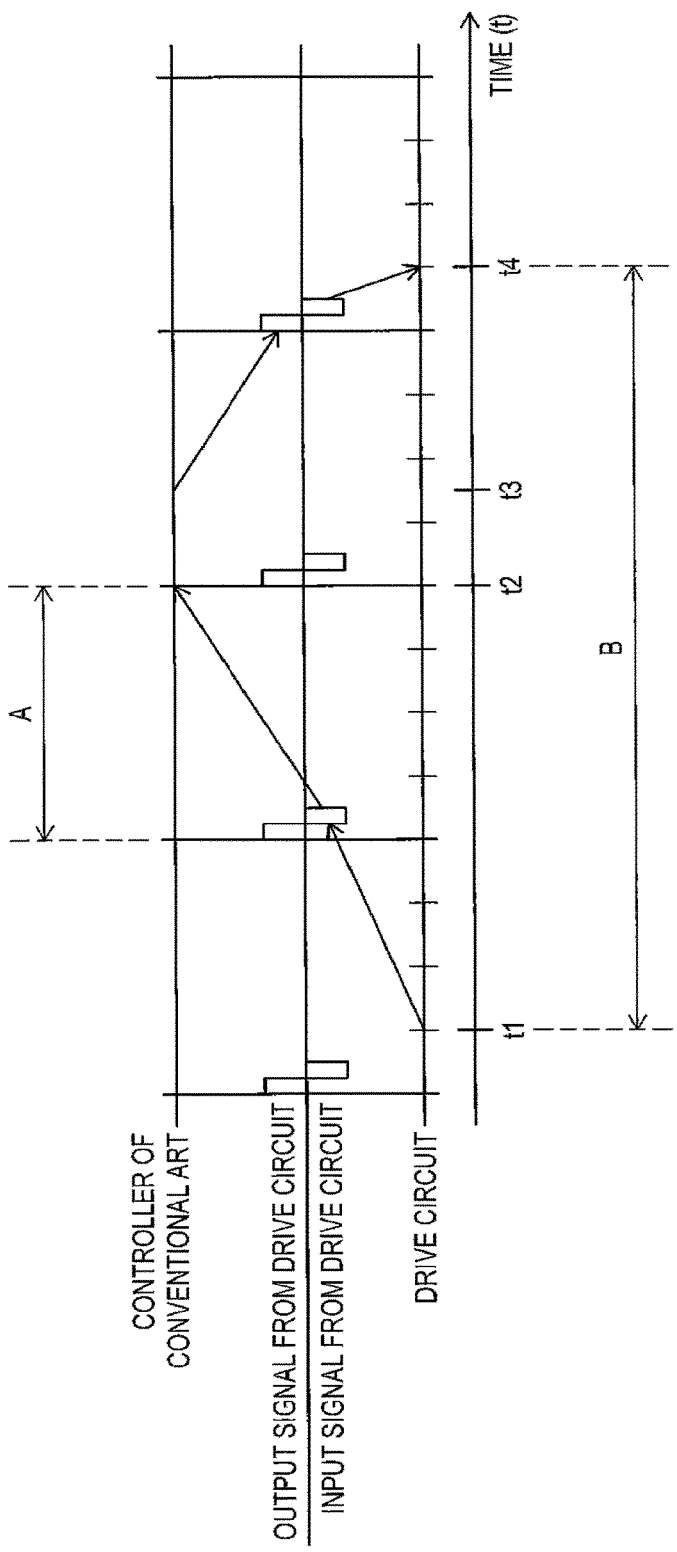
FIG. 4 is a diagram schematically illustrating a mode of transmission and reception of signals between a controller and a drive circuit of the related art.

Specifically, the control period of the controller of the related art is an A period, and as illustrated in FIG. 4, the controller of the related art is capable of transmitting and receiving an input signal from the drive circuit or an output signal to the drive circuit for each A period. In this controller, for example, in a case in which information relating to the positional information is output from the drive circuit at a time $t_1$, the information is input to the controller via a transmission path at a time $t_2$. The controller which receives the positional information as an input signal computes the control value of the electromagnetic motor based on the positional information. In other words, the controller computes the control value based on an input signal which is acquired within one period. After the controller stores the computed control value for a shorter time than the A period, or does not store the computed control value, the controller transmits a control instruction corresponding to the control value at a time $t_3$. The control instruction which is transmitted as an output signal is input to the drive circuit via the transmission path at a time $t_4$. When the control instruction is input, the drive circuit controls the actuation of the electromagnetic motor based on the control instruction. Accordingly, the mounting head 26 and the like move to the target position. The delay time in this case is the time from the time $t_1$ until the time $t_4$ ($t_4-t_1=B$).

Figure 5:
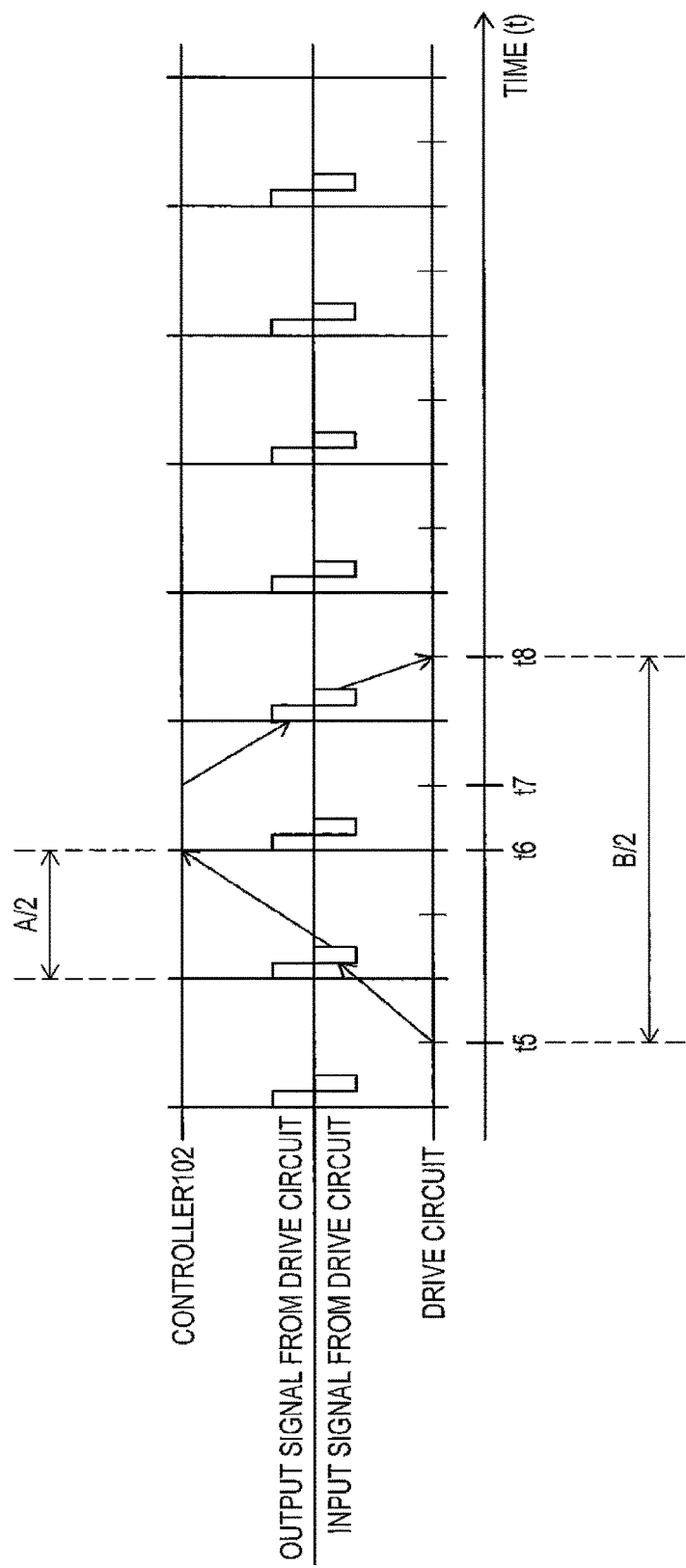
FIG. 5 is a diagram schematically illustrating a mode of transmission and reception of signals between the controller and a drive circuit of a moving device with which the electronic component mounting device of FIG. 1 is provided.

Meanwhile, the control period of the controller 102 of the mounting machine 16 is an A/2 period, which is half of the control period of the controller of the related art. Therefore, as illustrated in FIG. 5, the controller 102 is capable of transmitting and receiving an input signal from the drive circuit or an output signal to the drive circuit for each A/2 period. In this controller 102, for example, in a case in which information relating to the positional information is output from the drive circuit at a time $t_5$, the information is input to the controller 102 via a transmission path at a time $t_6$. The controller 102 which receives the positional information as an input signal computes the control value of the electromagnetic motor based on the positional information. After the controller stores the computed control value for a shorter time than the A/2 period, or does not store the computed control value, the controller transmits a control instruction corresponding to the control value at a time $t_7$. The control instruction is input to the drive circuit via the transmission path at a time $t_8$. When the control instruction is input, the drive circuit controls the actuation of the electromagnetic motor based on the control instruction. Accordingly, the mounting head 26 and the like move to the target position. The delay time in this case is the time from the time $t_8$ until the time $t_5$ ($t_8-t_5=B/2$), and is the same as half of the delay time of the controller of the related art. By adopting the controller 102 with the short control period in this manner, it becomes possible to shorten the delay time and it becomes possible to obtain an improvement in the control delay.

<Correction of Adverse Effects Caused by Improvement of Control Delay>

Figure 6:
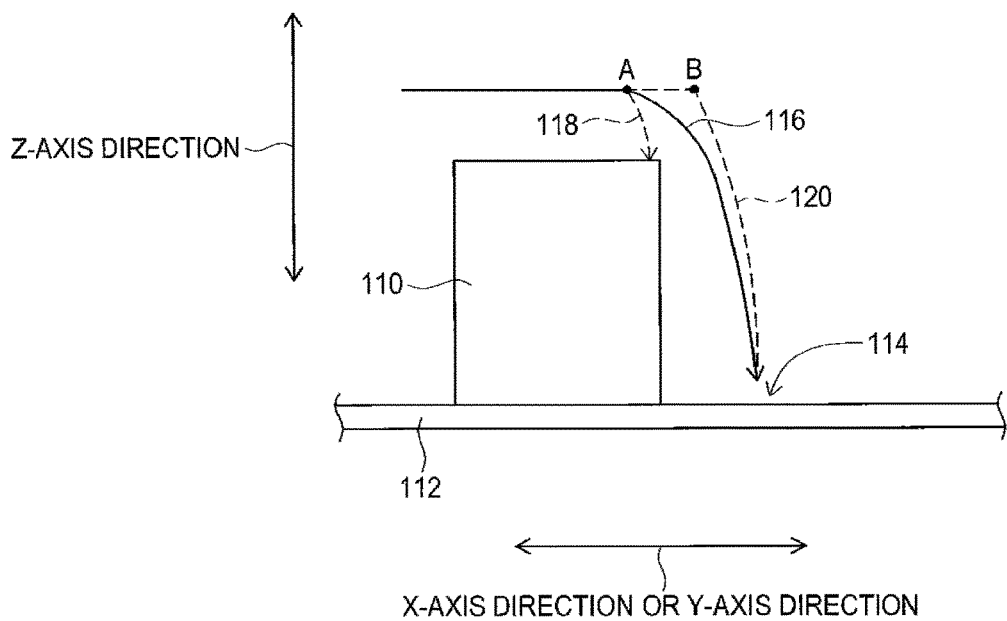
FIG. 6 is a diagram illustrating a movement track of an electronic component to be mounted to a circuit board.

However, due to the improvement in the control delay, that is, the shortening of the delay time, there is a concern that various adverse effects will arise. For example, when mounting the electronic component on the circuit board, instead of lowering the suction nozzle 62 after moving directly above the planned mounting position, the mounting head 26 which holds the electronic component lowers the suction nozzle 62 before moving directly above the planned mounting position. Specifically, as illustrated in FIG. 6, when an electronic component (not illustrated) is mounted to a planned mounting position 114 on a circuit board 112 on which an electronic component 110 is mounted, the mounting head 26 first moves toward the planned mounting position 114 due to the moving device 24. At this time, the electronic component which is held in the mounting head 26 moves in a position which is higher than the top end of the electronic component 110 which is mounted on the circuit board 112, as illustrated by solid line arrow 116.

When the electronic component which is held in the mounting head 26 reaches an A point, the actuation of the electromagnetic motor 76 of the unit lifting and lowering device 74 is controlled such that the suction nozzle 62 is lowered. At this time, the mounting head 26 continues moving toward the planned mounting position 114 due to the moving device 24. Accordingly, the electronic component which is held in the mounting head 26 is lowered along the track of a gentle curve toward the planned mounting position 114 while avoiding the electronic component 110 which is mounted on the circuit board 112, as illustrated by the solid line arrow 116. Accordingly, although only by a small amount, it is possible to shorten the mounting time.

However, the arrow 116 which is used in the description above is the track of an electronic component of a case in which the actuation of the mounting head 26 is controlled by a controller of the related art. Specifically, as described above, the mounting head 26 can be attached to and detached from the slider 50, and is capable of being shared between the mounting machine 16 and another mounting machine. Therefore, in a case in which the mounting head 26 is mounted to the slider of a mounting machine which is provided with a controller of the related art, the electronic component which is held in the mounting head 26 moves along the arrow 116 as described above.

Meanwhile, in a case in which the mounting head 26 is mounted to the slider 50 of the mounting machine 16, the actuation of the mounting head 26 is controlled by the controller 102. As described above, in the controller 102, the delay time is shortened and the control delay is improved. Therefore, when the actuation of the mounting head 26 is controlled by the controller 102, if the actuation of the mounting head 26 is controlled at the same timing as the controller of the related art, since the delay time is short, the mounting head 26 actuates responsively. Therefore, as illustrated in a dotted line arrow 118, the electronic circuit component which is held in the mounting head 26 is lowered, and there is a concern that the electronic component will collide with the electronic component 110 which is mounted to the circuit board 112.

In order to avoid such collisions, it is necessary to control the actuation of the electromagnetic motor 76 of the unit lifting and lowering device 74 such that the electronic component which is held in the mounting head 26 is lowered along a dotted line arrow 120 when the electronic component reaches a B point. However, in order to change the control timing and the like of the unit lifting and lowering device 74 of the mounting head 26, it is necessary to adjust the control program, the parameters, and the like, and this takes excessive labor.

Figure 7:
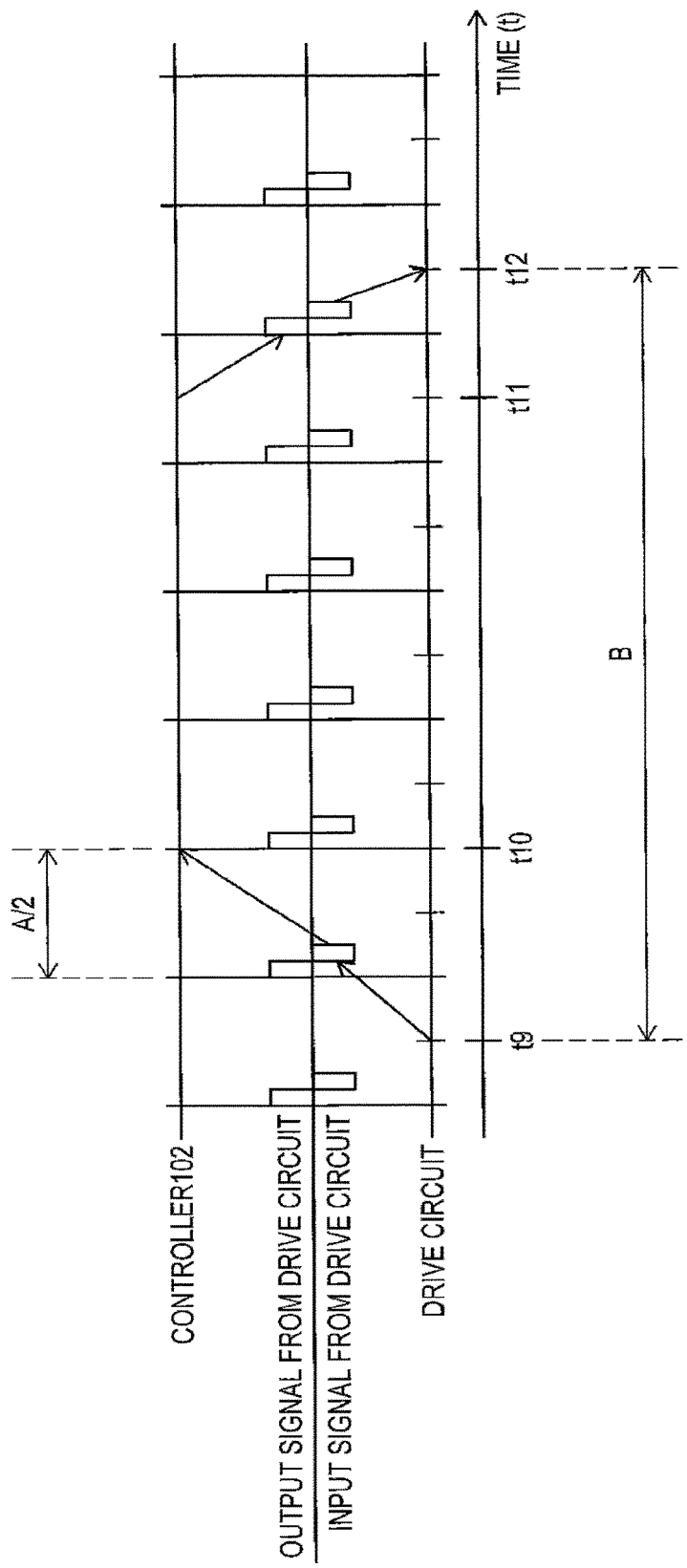
FIG. 7 is a diagram schematically illustrating a mode of transmission and reception of signals between the controller and the drive circuit of the mounting head with which the electronic component mounting device of FIG. 1 is provided.

In light of this, in the mounting machine 16, when controlling the actuation of the mounting head 26, the actuation of the mounting head 26 is controlled such that the delay time is the same as the delay time in the controller of the related art. Specifically, as illustrated in FIG. 7, in a case in which information relating to the positional information is output from the drive circuit at a time $t_9$, the information is input to the controller 102 via the transmission path at a time $t_{10}$. The controller 102 which receives the positional information as an input signal computes the control value of the electromagnetic motor 76 of the mounting head 26 based on the positional information.

When the computation is completed, after the controller 102 stores the computed control value for a time greater than or equal to the A/2 period, the controller 102 transmits the control instruction corresponding to the control value at a time $t_{11}$. The control instruction is input to the drive circuit via the transmission path at a time $t_{12}$. When the control instruction is input, the drive circuit controls the actuation of the electromagnetic motor 76 or the like based on the control instruction. The delay time in this case is the time from the time $t_{12}$ until the time $t_9$ ($t_{12}-t_9=B$), and is the same as the delay time of the controller of the related art. In other words, when the actuation of the mounting head 26 is controlled, the controller 102 computes the control value corresponding to the input signal which is acquired before one period instead of the input signal which is acquired within one period, and adjusts the delay time by storing the control value for greater than or equal to one period. Accordingly, it becomes possible to render the delay time in the controller 102 the same as the delay time in the controller of the related art, and it becomes possible to move the electronic component which is held in the mounting head 26 along the arrow 116 without changing the control program, the parameters, and the like. In this manner, by obtaining an adjustment in the delay time of the controller 102, the adverse effects caused by the improvements in the control delay are corrected.

As described above, in the controller 102 which controls the mounting head 26, the computed control value is stored for greater than or equal to one period; however, in the controller of the related art, the computed control value is stored for a shorter time than one period or is not stored, and the control value is transmitted. In other words, in the controller 102 which controls the mounting head 26, the time which is used in the computation may be lengthened in comparison to the controller or the like of the related art. Therefore, it becomes possible to suppress the computational capabilities of the controller 102, which is advantageous cost-wise.

Note that, when the mounting head 26 actuates, that is, when the suction nozzle 62 moves in the Z-axis direction due to the unit lifting and lowering device 74 or the like, there is a concern that a collision or the like of the electronic component will occur caused by the improvement in the control delay; however, when the moving device 24 actuates, that is, when the mounting head 26 moves in the X-axis direction and the Y-axis direction, there is no concern that a collision or the like of the electronic component will occur caused by the improvement in the control delay. Therefore, when controlling the actuation of the moving device 24, the controller 102 controls the actuation of the moving device 24 according to the method of the related art. In other words, after the controller 102 computes the control value corresponding to the input signal which is acquired within one period and stores the computed control value for a shorter time than the A/2 period, or does not store the computed control value, the controller 102 transmits the control instruction corresponding to the control value to the drive circuit. Accordingly, it becomes possible to shorten the delay time, and the moving device 24 actuates responsively.

Incidentally, in the example described above, the mounting machine 16 is an example of the manufacturing work machine. The moving device 24 is an example of a second actuator device and a moving device. The mounting head 26 is an example of an actuator device and a work head. The controller 102 is an example of a servo controller. The drive circuit 106 corresponding to the moving device 24 is an example of a second drive circuit. The drive circuit 106 corresponding to the mounting head 26 is an example of a drive circuit. The A/2 period is an example of a predetermined period. The A period is an example of a second period. The controller of the related art is an example of a second servo controller.

Note that, the disclosure is not limited to the example described above, and it is possible to carry out the disclosure in various modes subjected to various modifications and improvements based on the knowledge of a person skilled in the art. Specifically, for example, in the example described above, the technology of the disclosure is applied to the mounting machine 16 for executing the mounting work; however, it is possible to apply the technology of the disclosure to a device for executing various work on a circuit board. Specifically, for example, it is possible to apply the technology of the disclosure to a device for applying cream solder or the like to a circuit board, a device for ejecting an adhesive or the like onto a circuit board, a device for subjecting a circuit board to various processes, or the like. The technology of the disclosure is not limited to a device which performs work on a circuit board, and it is possible to apply the technology of the disclosure to various working machines which are used in manufacturing work.

REFERENCE SIGNS LIST

16: mounting machine (manufacturing work machine), 24: moving device (second actuator device) (moving device), 26: mounting head (actuator device) (work head), 102: controller (servo controller), 106: drive circuit

The invention claimed is:

1. A manufacturing work machine comprising:
a first actuator device,
a second actuator device which is different from the first actuator device, and
a servo controller configured to control the first actuator device and the second actuator device, wherein
the servo controller includes circuitry configured to:
receive an input signal from a first drive circuit corresponding to the first actuator device and transmit an output signal to the first drive circuit for each predetermined period;
compute a first output signal based on a first input signal which is received from the first drive circuit before the predetermined period, store the first output signal for a time greater than or equal to the predetermined period, and subsequently transmit the first output signal to the first drive circuit, the first output signal causing the first drive circuit to drive the first actuator device so as to avoid collisions between components of a workpiece of the manufacturing work machine;
receive an input signal from a second drive circuit corresponding to the second actuator device and transmit an output signal to the second drive circuit for each predetermined period; and
compute a second output signal based on a second input signal which is received from the second drive circuit within the predetermined period, store the second output signal for a shorter time than the predetermined period or not store the second output signal, and subsequently transmit the second output signal to the second drive circuit, the second output signal driving the second actuator device,
the first actuator device is a work head, and
the second actuator device is a moving device for moving the work head to an arbitrary position.

2. The manufacturing work machine according to claim 1, wherein
a time from a timing at which the first drive circuit transmits the first input signal to the servo controller until a timing at which the first drive circuit receives the first output signal from the servo controller is the same as a time from a timing at which the first drive circuit transmits a third input signal to a second servo controller until a timing at which the first drive circuit receives a third output signal from the second servo controller, and
the second servo controller is configured to
receive an input signal from the first drive circuit or transmit an output signal to the first drive circuit for each second period which is longer than the predetermined period; and
compute the third output signal based on the third input signal which is received from the first drive circuit within the second period, store the third output signal for a shorter time than the second period or not store the third output signal, and subsequently transmit the third output signal to the first drive circuit.

3. A manufacturing work machine comprising:
an actuator device, and
a servo controller configured to control the actuator device, wherein
the servo controller includes circuitry configured to:
receive an input signal from a drive circuit corresponding to the actuator device and transmit an output signal to the drive circuit for each predetermined period;
compute a first output signal based on a first input signal which is received from the drive circuit before the predetermined period, store the first output signal for a time greater than or equal to the predetermined period, and subsequently transmit the first output signal to the first drive circuit, the first output signal causing the drive circuit to drive the actuator device so as to avoid collisions between components of a workpiece of the manufacturing work machine; and
receive an input signal from a second drive circuit corresponding to a second actuator device of the manufacturing work machine which is different from the actuator device and transmit an output signal to the second drive circuit for each predetermined period,
a time from a timing at which the drive circuit transmits the first input signal to the servo controller until a timing at which the drive circuit receives the first output signal from the servo controller is the same as a time from a timing at which the drive circuit transmits a second input signal to a second servo controller until a timing at which the drive circuit receives a second output signal from the second servo controller,
the second servo controller is configured to
receive an input signal from the drive circuit or transmit an output signal to the drive circuit for each second period which is longer than the predetermined period; and
compute the second output signal based on the second input signal which is received from the drive circuit within the second period, store the second output signal fora shorter time than the second period or not store the second output signal, and subsequentlytransmit the second output signal to the drive circuit,
the actuator device is a work head, and
the second actuator device is a moving device for moving the work head to an arbitrary position.

4. The manufacturing work machine according to claim 3, wherein the circuitry is configured to:
compute a third output signal based on a third input signal which is received from the second drive circuit within the predetermined period, store the third output signal for a shorter time than the predetermined period or not store the third output signal, and subsequently transmit the third output signal to the second drive circuit.

* * * * *